UNITED STATES PATENT OFFICE.

EMILE VIELHOMME, OF FROGES, FRANCE.

PROCESS OF MANUFACTURING RICH FERROCHROMIUM.

SPECIFICATION forming part of Letters Patent No. 648,119, dated April 24, 1900.

Application filed July 25, 1899. Serial No. 725,041. (No specimens.)

*To all whom it may concern:*

Be it known that I, EMILE VIELHOMME, chemist, a citizen of the Republic of France, residing at Froges, Isère, France, have invented Improvements in the Manufacture of Rich Ferrochromium, of which the following is a specification.

There is considerable interest in obtaining rich ferrochromium—that is to say, containing much chromium. Purchasers prefer it on account of its containing less carbon and for several other reasons. On the other hand, ores rich in chromium are rare and dear, and, moreover, when treated according to the ordinary methods they do not allow one to obtain a product so rich and free from carbon as the metal produced by the method which forms the subject of the present application for patent.

Chromite is treated in the electric furnace with a flux suited to the conditions—kaolin, lime, fluor-spar, &c. The action of the electric current is continued after complete reduction and fusion until total or partial volatilization of the iron. The boiling-point of chromium being higher, the product becomes richer in chromium as it becomes poorer in iron. The part played by the flux is not only to produce a fusible slag, but by its presence in the crucible it furnishes a medium moderately resisting the passage of the current, which allows of easy regulation and secures high temperature; also, by its partial volatilization there is a drawing off of the iron vapors.

Chromite containing oxids of chromium, iron, magnesium, calcium, aluminium, and silicon in various proportions according to its quality has added to it in form of coke or other carbon, coarsely broken, the quantity of carbon necessary and sufficient for reducing the oxids of chromium and iron by forming oxids of carbon. As for the flux, its quantity may be varied at will. The more there is of it the more easily is the operation conducted; but an excess involves expenditure of electric energy. With my furnace twenty to twenty-five kilograms of lime, sand, kaolin, and fluor-spar are employed for one hundred kilograms of chromite treated.

I claim—

The process of manufacturing rich ferrochromium which consists in subjecting chromite to the heat of an electric furnace in the presence of a suitable flux and a quanity of pulverized coke, the temperature being sufficient for the reduction and fusion of the ore and for the volatilization of most of the iron, the remaining iron being alloyed with the chromium only in the proportion necessary to constitute a rich chrome iron.

In witness whereof I have hereunto signed my name, this 12th day of July, 1899, in the presence of two subscribing witnesses.

EMILE VIELHOMME.

Witnesses:
   SATURLE-HOWLET,
   DEBON.